(12) United States Patent
Leeds

(10) Patent No.: US 8,342,603 B2
(45) Date of Patent: *Jan. 1, 2013

(54) SEAT ASSEMBLY

(75) Inventor: Richard M. Leeds, New York, NY (US)

(73) Assignee: Nightgear LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/038,919

(22) Filed: Mar. 2, 2011

(65) Prior Publication Data

US 2011/0163144 A1 Jul. 7, 2011

Related U.S. Application Data

(63) Continuation of application No. 11/728,788, filed on Mar. 27, 2007, now Pat. No. 7,917,403, which is a continuation-in-part of application No. 11/602,058, filed on Nov. 20, 2006, now Pat. No. 7,461,894.

(60) Provisional application No. 60/738,618, filed on Nov. 21, 2005.

(51) Int. Cl.
*A47C 27/00* (2006.01)

(52) U.S. Cl. .................. 297/229; 297/228.1; 297/219.1

(58) Field of Classification Search .................. 297/229, 297/228.1, 218.1, 219.1
See application file for complete search history.

(56) References Cited

U.S. PATENT DOCUMENTS

| 2,835,313 | A | 5/1958 | Dodge |
| 3,232,665 | A | 2/1966 | Von Wimmersperg |
| 3,663,973 | A | 5/1972 | Spence |
| 3,885,257 | A | 5/1975 | Rogers |
| 4,031,579 | A | 6/1977 | Larned |
| 4,103,968 | A | 8/1978 | Butterfield et al. |
| 4,143,909 | A | 3/1979 | McFarlin |
| 4,329,747 | A | 5/1982 | Russell |

(Continued)

FOREIGN PATENT DOCUMENTS

GB 2413488 11/2005

(Continued)

OTHER PUBLICATIONS

Aerospace Technology Innovation—vol. 6, No. 3, May/Jun. 1998—Technology Transfer.

(Continued)

*Primary Examiner* — Peter Brown
*Assistant Examiner* — Erika Garrett
(74) *Attorney, Agent, or Firm* — Gerald E. Hespos; Michael J. Porco

(57) ABSTRACT

A seating pad assembly is provided for use by travelers to increase the comfort for a seat on a public transportation vehicle or at a public transit terminal. A system and method for ordering the seating pad assembly for a transportation seat includes at least one terminal configured for entering an identifier indicative of a type of transportation seat purchased, e.g., a class of service; a server configured for receiving the identifier, determining dimensions of the seating pad assembly based on the identifier, and generating an order to acquire the determined seating pad assembly; and a communications network for coupling the at least one terminal and the server. The terminal may be configured in the form of a computer, a kiosk or a mobile terminal. The system will allow a purchaser of a transportation seat to either purchase or rent the seating pad assembly.

11 Claims, 9 Drawing Sheets

U.S. PATENT DOCUMENTS

| | | | |
|---|---|---|---|
| 4,450,193 A | 5/1984 | Staebler | |
| 4,456,642 A | 6/1984 | Burgdorfer et al. | |
| 4,504,990 A | 3/1985 | Scales et al. | |
| 4,535,495 A | 8/1985 | Oldfield | |
| 4,539,057 A | 9/1985 | Ahlm | |
| 4,597,605 A | 7/1986 | Gilbert | |
| 4,601,076 A | 7/1986 | Knobeloch | |
| 4,620,337 A | 11/1986 | Williams et al. | |
| 4,672,700 A | 6/1987 | Poncy | |
| 4,696,516 A | 9/1987 | Yeum | |
| 4,741,058 A | 5/1988 | Williams et al. | |
| 4,788,730 A | 12/1988 | Bexton | |
| 4,967,433 A | 11/1990 | Neal | |
| 4,991,245 A | 2/1991 | Franco | |
| 5,010,610 A | 4/1991 | Ackley | |
| 5,141,285 A | 8/1992 | Park | |
| 5,189,747 A | 3/1993 | Mundy et al. | |
| 5,210,891 A | 5/1993 | Avital et al. | |
| 5,370,440 A | 12/1994 | Rogala | |
| 5,384,923 A | 1/1995 | Hwang et al. | |
| 5,403,065 A | 4/1995 | Callerio | |
| 5,404,600 A | 4/1995 | DeMars | |
| 5,414,881 A | 5/1995 | Terrazas | |
| 5,473,785 A | 12/1995 | Lager et al. | |
| 5,524,308 A * | 6/1996 | Hwang et al. | 5/644 |
| 5,639,145 A | 6/1997 | Alderman | |
| 5,678,266 A | 10/1997 | Petringa et al. | |
| 5,720,057 A | 2/1998 | Duncan | |
| 5,758,926 A | 6/1998 | Wilkie et al. | |
| 5,797,154 A | 8/1998 | Contreras | |
| 5,893,184 A | 4/1999 | Murphy | |
| 5,950,264 A | 9/1999 | Wyner et al. | |
| D417,984 S | 12/1999 | Sand | |
| 6,009,577 A | 1/2000 | Day | |
| 6,108,835 A | 8/2000 | Hwang | |
| 6,135,560 A | 10/2000 | Fagg | |
| 6,159,574 A | 12/2000 | Landvik et al. | |
| 6,164,726 A | 12/2000 | Reeves et al. | |
| 6,175,980 B1 | 1/2001 | Gaither | |
| 6,209,159 B1 | 4/2001 | Murphy | |
| 6,221,827 B1 | 4/2001 | Mendoza Cruz et al. | |
| 6,237,173 B1 | 5/2001 | Schlichter | |
| 6,241,188 B1 | 6/2001 | Simpson | |
| 6,363,553 B1 | 4/2002 | Baumgartel et al. | |
| 6,367,106 B1 | 4/2002 | Gronsman | |
| 6,378,948 B1 | 4/2002 | Macher et al. | |
| 6,391,933 B1 | 5/2002 | Mattesky | |
| 6,421,859 B1 * | 7/2002 | Hicks et al. | 5/722 |
| 6,473,924 B1 | 11/2002 | Sorbo et al. | |
| 6,532,611 B1 | 3/2003 | Day | |
| 6,541,094 B1 | 4/2003 | Landvik et al. | |
| 6,564,407 B1 | 5/2003 | Luu et al. | |
| 6,578,219 B1 | 6/2003 | Gabel et al. | |
| 6,588,038 B1 | 7/2003 | Bondie et al. | |
| 6,588,840 B1 | 7/2003 | Lombardo | |
| 6,598,251 B2 | 7/2003 | Habboub et al. | |
| 6,602,579 B2 | 8/2003 | Landvik | |
| 6,640,359 B1 | 11/2003 | Alane | |
| 6,648,410 B2 | 11/2003 | Sparks | |
| 6,653,363 B1 | 11/2003 | Tursi, Jr. et al. | |
| 6,659,552 B2 | 12/2003 | Duncan | |
| 6,709,729 B2 | 3/2004 | Baruch | |
| 6,733,083 B1 | 5/2004 | Landvik et al. | |
| 6,751,816 B1 * | 6/2004 | Wechsler | 5/417 |
| 6,764,134 B1 | 7/2004 | Crescenzi et al. | |
| 6,773,074 B2 | 8/2004 | Flory et al. | |
| 6,783,175 B1 | 8/2004 | Henderson | |
| 6,851,141 B2 | 2/2005 | McMahan | |
| 6,866,915 B2 | 3/2005 | Landvik | |
| 6,895,619 B1 | 5/2005 | Lee | |
| 6,896,331 B2 | 5/2005 | Kassai et al. | |
| 6,922,862 B1 | 8/2005 | Thompson | |
| 6,951,367 B1 * | 10/2005 | Dinnan | 297/228.12 |
| 6,957,465 B1 | 10/2005 | Oprandi | |
| 6,964,074 B2 | 11/2005 | Carlitz | |
| 7,024,714 B1 | 4/2006 | Yates | |
| 7,070,238 B1 | 7/2006 | Alexander et al. | |
| 7,134,729 B2 | 11/2006 | Dowty et al. | |
| 7,155,765 B2 | 1/2007 | Fogg | |
| 7,255,395 B2 | 8/2007 | Garrido | |
| 7,258,399 B2 | 8/2007 | Neustat | |
| 7,303,234 B2 | 12/2007 | Dowty | |
| 7,363,667 B2 | 4/2008 | Borror et al. | |
| 7,377,585 B2 | 5/2008 | Neustat | |
| 7,386,903 B2 | 6/2008 | Hochschild | |
| 7,461,894 B2 | 12/2008 | Leeds | |
| 7,731,283 B2 * | 6/2010 | Leeds | 297/229 |
| 7,789,461 B2 * | 9/2010 | Leeds | 297/229 |
| 2001/0027557 A1 | 10/2001 | Shinkawa et al. | |
| 2004/0044091 A1 | 3/2004 | Niederoest et al. | |
| 2004/0088788 A1 | 5/2004 | Alane | |
| 2004/0088789 A1 | 5/2004 | Mitchell | |
| 2004/0237194 A1 | 12/2004 | McMahan | |
| 2004/0237206 A1 | 12/2004 | Webster et al. | |
| 2004/0254256 A1 | 12/2004 | Lockwood et al. | |
| 2005/0046266 A1 | 3/2005 | Schiebl | |
| 2005/0066445 A1 | 3/2005 | Christofferson et al. | |
| 2005/0076442 A1 | 4/2005 | Wassilefky | |
| 2005/0084667 A1 | 4/2005 | Landvik et al. | |
| 2005/0110319 A1 | 5/2005 | Villalobos | |
| 2005/0166326 A1 | 8/2005 | Chaffee | |
| 2005/0210595 A1 | 9/2005 | Di Stasio et al. | |
| 2006/0022504 A1 | 2/2006 | Johnson et al. | |
| 2006/0053562 A1 | 3/2006 | Poulos et al. | |
| 2006/0064817 A1 | 3/2006 | Heimowitz | |
| 2006/0112491 A1 | 6/2006 | Buehner | |
| 2006/0162088 A1 | 7/2006 | Daly | |
| 2006/0200910 A1 | 9/2006 | Taylor | |
| 2007/0040424 A1 | 2/2007 | Neustat | |
| 2007/0044241 A1 | 3/2007 | Clark | |
| 2007/0094803 A1 | 5/2007 | Fogg | |
| 2007/0157355 A1 | 7/2007 | Katsin | |
| 2007/0197675 A1 | 8/2007 | Matsumoto | |
| 2007/0226911 A1 | 10/2007 | Gladney et al. | |
| 2007/0234482 A1 | 10/2007 | Wright | |
| 2007/0251013 A1 | 11/2007 | Borror et al. | |
| 2007/0252417 A1 | 11/2007 | Neustat | |
| 2007/0271705 A1 | 11/2007 | Woolfson et al. | |
| 2008/0042478 A1 | 2/2008 | Neustat | |
| 2008/0098523 A1 | 5/2008 | Borrow et al. | |

FOREIGN PATENT DOCUMENTS

| | | |
|---|---|---|
| GB | 2422307 | 7/2006 |

OTHER PUBLICATIONS

"Going to the mattresses"—Sunday, Feb. 13, 2005—by Meredith Goad, Portland Press Herald Writer.
"Tempur-Pedic: Viscoelastic"—Mar. 8, 2005—website pp. 1-2.
"Tempur-Pedic" The NASA Connection—Mar. 8, 2005—website pp. 1-2.
"Tempur-Pedic" FAQ—Mar. 8, 2005—website pp. 1-4.
"Ningbo Shida Industry Co., Ltd"—Mar. 8, 2005—website pp. 1-2.
"Forty-Year-Old Foam Springs Back With New Benefits"—Jan. 1, 2005—pp. 1-5.
"25% IFD and Support Factor"—Jun. 8, 2008 website.
"Measuring Density One Cubic Foot of Foam Being Weighted to Measure Density"—Jun. 8, 2008 website.
"Density in Flexible Polyurethane Foam (FPF) Lesson for 50 Minute Class"—pp. 1-4.
"Properties that Affect FPF Performance".
"Firmness and Support in Flexible Polyurethane Foam (FPF) Lesson Plan for 50 Minute Class"—pp. 1-4.
"In Touch"—vol. 1, No. 1, Feb. 1991—Information on Flexible Polyurethane Foam.
"In Touch"—vol. 1, No. 2, May 1991—Information on Flexible Polyurethane Foam.
"In Touch"—vol. 1, No. 5, Dec. 1991—Information on Flexible Polyurethane Foam.
"In Touch"—vol. 3, No. 1, Mar. 1993—Information on Flexible Polyurethane Foam.
"In Touch"—vol. 4, No. 2, Jun. 1994—Information on Flexible Polyurethane Foam.
"In Touch"—vol. 4, No. 3, Jul. 1994—Information on Flexible Polyurethane Foam.

"In Touch"—vol. 5, No. 1, May 1995—Information on Flexible Polyurethane Foam.
"In Touch"—vol. 8, No. 1, May 2000—Information on Flexible Polyurethane Foam.
"In Touch"—vol. 11, No. 1, Jun. 2003—Information on Flexible Polyurethane Foam.
"In Touch"—vol. 12, No. 1, Mar. 2005—Information on Flexible Polyurethane Foam.
"In Touch"—vol. 13, No. 1, Aug. 2006—Information on Flexible Polyurethane Foam.
"The Polyurethanes Book"—Editors: David Randall and Steve Lee—Copyright 2002 pp. 203-244.
"Viscoelastic Solids"—Roderic S. Lakes—Copyright 1999—Chapter 10, pp. 371-431.
"Introduction to Polymer Viscoelasticity"—Third Edition—Montgomery T. Shaw, William J. MacKnight—Copyright 2005—Introduction—pp. 1-6.

* cited by examiner

SEAT ASSEMBLY

CROSS REFERENCE TO RELATED APPLICATIONS

This application is a continuation of application Ser. No. 11/728,788, filed Mar. 27, 2007 which is a continuation-in-part of application Ser. No. 11/602,058, filed Nov. 20, 2006, now U.S. Pat. No. 7,461,894 which in turn claims the benefit of U.S. Provisional Patent Appl. No. 60/738,618 filed Nov. 21, 2005.

BACKGROUND OF THE INVENTION

1. Field of the Invention

The invention relates to an accessory to make a seat more comfortable.

2. Description of the Related Art

Travel on public transportation, such as planes, trains and buses, is rarely comfortable and can be extremely uncomfortable on long trips. The length of time after which a seat will be considered comfortable varies widely based on the characteristics of the seat and sensitivity of the traveler. Many travelers become extremely uncomfortable after an hour or two on a transportation seat, especially since seats intended for shorter trips generally do not recline or recline only a small amount. On the other hand, intercontinental flights can last in excess of twelve hours and are common for many business people. Most business travelers have little time for recovery at either end of a business trip, and are expected to be alert and functioning for a business meeting shortly after their arrival. Vacation travelers suffer from the same inconveniences as business travelers and are likely to require a considerable recovery time before being able to enjoy the vacation. Uncomfortable travel is not limited to airlines. In particular, trips on a train or bus can take longer than an intercontinental airline trip. Travel related discomfort also is not limited to the time spent on the vehicle. More particularly, travelers often spend hours in very uncomfortable seats at an airline, train or bus terminal while they are waiting for a transfer or a delayed departure. Seats at a terminal often are less comfortable than seats on a plane, train or bus. For example, terminal seats often have a large gap between the hip/thigh support and the back support and may be formed from a hard rigid plastic.

Most long distance travelers take steps to minimize the discomfort and inconveniences of travel. For example, some long distance travelers adapt a regimen of sleeping, eating and drinking for several days prior to a trip in an effort to make the travel more comfortable. Long distance travelers also may adopt specific regimens during the flight in an effort to minimize discomfort. For example, many travelers utilize sleep-inducing medication either shortly before the start of a trip or partway into the trip. Airline personnel frequently distribute pillows, blankets, slippers and eye shades a short time into the flight.

The seats on planes and surface vehicles intended for long distance travel recline to enhance comfort. Most airlines and trains provide different levels of seating that are offered at different costs. Business class seats generally are wider than coach seats and generally recline more. First class seats may be wider still, and some first class seats recline to a full horizontal position. However, all reclining seats necessary include several movable components that enable the seat to be adjusted between a fully erect condition and at least a partly reclined condition. FIGS. 1 through 3 show a typical prior art airline seat similar to those used in business class or first class sections of a airplane. The prior art seat is identified generally by the numeral 100 in FIGS. 1 through 3 and includes a hip/thigh support 102 disposed between arm rests 104. The hip/thigh support 102 of the prior art seat 100 has a width "w" of between about 18 inches and 27 inches, depending on the airline and the class of service (i.e. coach, business or first class). A back support 106 is hinged to the hip/thigh support 102 and can move between a substantially erect condition, as shown in FIG. 1, and a partly reclined position, as shown in FIG. 2. A fully reclined position, as shown in FIG. 3, is provided for first class seats on some airlines. The typical prior art seat 100 has a length "l" of between about 70 inches and 76 inches. A gap 108 necessarily is provided between these two hinged supports 102 and 106 to accommodate the relative movement. The seat 100 also may have a foot rest 110 that is hinged relative to the hip/thigh support 102, and a similar gap 112 exists between the hip/thigh support 102 and the foot rest 110. Furthermore, other cracks, creases and seams 114, 116, 118 and 120 exist at other locations on the hip/thigh support 102 and the back support 106. Still other structurally uneven areas (e.g. frame members and other structural supports) exist beneath the cover of the seat 100, and contribute to passenger discomfort even though they are not visible. The gaps 108 and 112 and other cracks, creases and seams 114-120 may be barely noticeable on a short trip. However, the gaps 108, 112 and other cracks, creases and seams 114-120 that are wider than about 1 cm and/or deeper than about 1 cm become very bothersome on long trips. In this regard, the gaps 108, 112 and other significant surface discontinuities 114-120 define pinch points into which bodily tissue will be squeezed due to the weight of the body. Pressure on the body at these pinch points may be higher, thereby impeding blood flow and creating discomfort at and near the surface of the skin. Long distance travelers frequently move and shift their bodily weight to reduce discomfort. However, such movement creates pulling and friction as the bodily tissue is extracted from the pinch points and as new areas of bodily tissue are urged into the pinch points. Furthermore, all vehicles vibrate during movement, and the vibration contributes significantly to discomfort generated at the pinch points even when the passenger does not attempt to move voluntarily.

The seat covers on most public transportation seats are designed to be durable and easily cleaned. These requirements often compete with the passenger's desire for comfort. A fabric that will last long and clean easily often is not comfortable for an extended period of time. Many public transportation seats are designed to provide a pronounced and somewhat rigid lumber support to align with the lower back and a bulging head support near the top end of the back rest. These features often add to comfort when the passenger is sitting in an erect position. However, these same features contribute to discomfort when the passenger reclines the seat for sleep.

Virtually all public transportation seats include arm rests and some include forwardly projecting privacy wing on opposite sides of the back rest. The arm rest and wings are intended to prevent intrusion by an adjacent passenger. These fairly rigid and highly function components can lead to discomfort when the seat is reclined so that the passenger can sleep.

The prior art include many types of formed pillows that are intended to support certain areas of the body. For example, U-shaped pillows are used to support the back of the neck. Other uniquely configured pillows are intended to support the feet, the rear side of the knees or areas between the knees.

Generally rectangular mats are used in many Asian cultures for sleeping or for performing Yoga. These mats tend to be formed from thin relatively inelastic materials that are not suitable for body cushioning. Mats of this type generally have length and width dimensions corresponding approximately to the length and width dimensions of a bed. The mats typically are sufficiently flexible to be folded or rolled for storage between uses.

Viscoelastic materials and memory foam are terms used to define a variety of open cell flexible polyurethane foams, and have been used for mattresses, mattress toppers and pillows for years. More particularly, the lower surface of the viscoelastic foam will be placed on a generally flat horizontal supporting surface, such as a box spring or mattress. The upper surface of the viscoelastic foam will mold closely to the contour of an object or body placed thereon. The viscoelastic foam then will return slowly to an undeformed shape when the object or body is removed or repositioned. In contrast, conventional foamed rubber will compress quickly in response to an applied load and will return quickly upon removal of the load. Furthermore, the compressed conventional foamed rubber will not conform to the shape of the applied load and will not distribute forces of the applied load. Viscoelastics have not been used in public transportation seating, presumably in view of cost considerations and yield characteristics that are not conducive to requirements for a public transportation seat in the normally erect orientation.

In view of the above, it is object of the subject invention to provide improvements to the comfort for public transit seating, particularly seating intended for long distance travel.

It is a further object of the subject invention to provide a public transportation seating improvement well suited for use and carrying by a traveler.

SUMMARY OF THE INVENTION

The invention relates to a seating pad assembly for use with a public transportation seat and to the combination of a seating pad assembly and a public transportation seat. The invention also relates to a method for enhancing the comfort of a public transportation seat. The public transportation seat preferably is an airline seat, but may also be a seat employed on trains, buses and other land vehicles. The seat includes a generally horizontal hip and thigh support and a seat back pivotally mounted to the hip and thigh support. The seat may further include a foot rest. The seat back and/or the foot rest preferably are mounted for pivoting relative to the hip and thigh support. Accordingly, seams, cracks, creases, gaps or spaces exist between the foot rest and the hip/thigh support and between the back rest and the hip/thigh support. Some of these gaps exceed 1 cm in width and/or depth. The seat may further include arm rests spaced from one another by approximately the width of the seat. The spacing between the arm rests, and hence the width of the seat, may vary in accordance with the mode of transportation and the class of service. The seat may further include safety belts for securing the passenger in the seat.

The seating pad assembly may be generally rectangular and preferably has a width corresponding approximately to the width of the seat. The width of the seating pad assembly preferably is selected in accordance with the class of travel. For example, a seating pad assembly for economy travel preferably is about sixteen inches wide, while a seating pad assembly for business or first class travel preferably is about twenty inches wide. The seating pad assembly also preferably has a length approximately equal to the sum of the length of the hip/thigh support and the length of the back support, particularly for coach class travel. Specifically, the seating pad assembly for economy class travel preferably is at least about 42 inches long and preferably about 47 inches long. Additionally, the seating pad assembly may include a foot rest extension with a length approximately equal to the length of the foot rest on the public transit seat and particularly for business or first class airline seats. Specifically, the seating pad assembly for business or first class travel preferably is about 60 inches long and preferably about 72 inches long. Additionally, the seating pad assembly preferably has a thickness of between 1.0-2.0 inch, and most preferably about 1.00 inch.

The seating pad assembly comprises a substantially rectangular cushion that preferably consists of viscoelastic material. The viscoelastic cushion preferably has width, length and thickness dimensions corresponding to the overall width, length and thickness dimensions for the assembly, as set forth above. Additionally, the viscoelastic cushion preferably has a density and hardness or firmness to support a traveler comfortably across all locations on the seat, including across the seams, gaps and other pinch points between adjacent movable parts of the seat, including those that are at least 1 cm across and at least 1 cm deep. In this regard, the density, firmness, resiliency and thickness of the viscoelastic cushion are selected so that lower areas of the viscoelastic cushion will flow into and conform to the gaps and other pinch points, thereby creating a substantially smooth surface for supporting the traveler. Furthermore, these density, firmness, resiliency and thickness characteristics of the viscoelastic cushion are selected to ensure that the weight of the traveler will be distributed and supported by upper parts of the viscoelastic cushion without a bottoming out that would occur if the viscoelastic cushion was deformed maximally. Thus, the viscoelastic cushion isolates the traveler from the bothersome pinch points. Furthermore, the viscoelastic material is extremely effective at absorbing the vibrations that are inherent in vehicular travel, and hence isolates the traveler from those vibrations. As noted above, vibrations contribute to discomfort, particularly near the pinch points formed in the seat.

The seating pad assembly further includes a cover assembly mounted over the viscoelastic cushion. At least a portion of the cover assembly preferably is removable for laundering or replacement. The cover assembly preferably is stretchable or sufficiently loose to deform easily into gaps or other pinch points defined in the seat. Thus, the cover assembly will not restrict or limit the ability of the viscoelastic material to flow or otherwise conform to the shapes of the seat and the traveler, and the nonrestrictive cover assembly will move easily with the viscoelastic material as the viscoelastic material changes its shape. The cover assembly preferably includes an inner screen layer preferably formed from a synthetic material, such as nylon that contributes to the protection and support of the viscoelastic cushion. The inner screen layer need not be removable. The cover assembly also preferably includes an inner protective cover that may be fluid resistant, stain resistant, antimicrobial and/or moisture wicking. The inner protective cover prevents permanent damage to the viscoelastic pad. Preferably, the inner cover has a zipper or other closure means to permit the inner cover to be removed from the viscoelastic pad for laundering or replacement. The cover assembly also includes an outer cover that preferably is formed from a material that is fluid resistant, stain resistant antimicrobial and moisture wicking. Additionally, the outer cover is formed from a material, such as cotton or a brushed synthetic fabric that will be comfortable to the passenger. In some instances, the cover may be imprinted or embroidered with indicia to identify an airline or other public transit provider or to identify the owner or source of the seating pad assembly. The outer cover also has a zipper or other closure means to permit the outer cover to be removed for laundering or replacement. The closure for the outer cover may be offset from the closure for the inner cover. The outer cover also may include a strap for releasably securing the seating pad assembly in a rolled condition for easy storage and carrying through an airport or other transit terminal. The strap also can be used to hold the seating pad assembly on a seat.

The seating pad assembly may include means for releasable attachment to the public transportation seat. For example, a snapped attachment can be provided for releasable engagement with snaps provided on the top of the seat back. In other situations, the seating pad assembly may be provided with notches or apertures for receiving a seat belt.

The seating pad assembly may further include or may be used with a carrying bag. The carrying bag has a selectively closable end. The selectively closable end may have a flap, a draw string or the like. The carrying bag may further include a strap or a loop to carry the bag over the shoulder or to facilitate mounting and transportation of the bag and seating pad assembly on a rolling piece of luggage or to a backpack.

The seating pad assembly can be transported to an airport, train station or the like by a passenger. The passenger need merely remove the seating pad assembly from the bag and position the seating pad assembly on the seat before the person sits down. Thus, the seating pad assembly is not one of the pieces of carry-on luggage that must be stored in an overhead compartment. The passenger then can assume a normal sitting posture to hold the pad in place. Controls on the seat can be utilized to move the seat into a reclined condition at an appropriate time during the trip, if desired and if such controls are available. The seating pad assembly will extend continuously across seams and/or creases between the movable parts of the seat and will conform to the shapes of both the seat and the passenger to maximize comfort. The cover assembly will not restrict the flowing deformation of the viscoelastic material, and hence the cover will not affect the conformal characteristics of both the upper and lower areas of the viscoelastic material. Additionally, the seating pad assembly can be dimensioned to provide lateral support between the passenger and arm rests.

A method for ordering a seating pad assembly for a transportation seat is provided. The method includes receiving an identifier indicative of a type of transportation seat purchased; determining dimensions of the seating pad assembly based on the type of transportation seat purchased; generating an order to acquire the determined seating pad assembly; and fulfilling the generated order to complete acquisition of the seating pad assembly. The identifier may be a class of service, e.g., coach, business class or first class of an airline seat. The method further includes receiving a second identifier indicative of a transportation seat provider and selecting a cover assembly for the seating pad assembly bearing an indicia of the transportation seat provider.

The seating pad assembly can either be purchased or rented for a predetermined purchase amount. In certain embodiments, frequent fliers miles may be used for the predetermined purchased amount.

A system for ordering a seating pad assembly for a transportation seat includes at least one terminal configured for entering an identifier indicative of a type of transportation seat purchased; a server configured for receiving the identifier, determining dimensions of the seating pad assembly based on the identifier, and generating an order to acquire the determined seating pad assembly; and a communications network for coupling the at least one terminal and the server. The at least one terminal may be configured as a computer, a kiosk or a mobile terminal.

DETAILED DESCRIPTION OF THE PREFERRED EMBODIMENT

Figure 1:
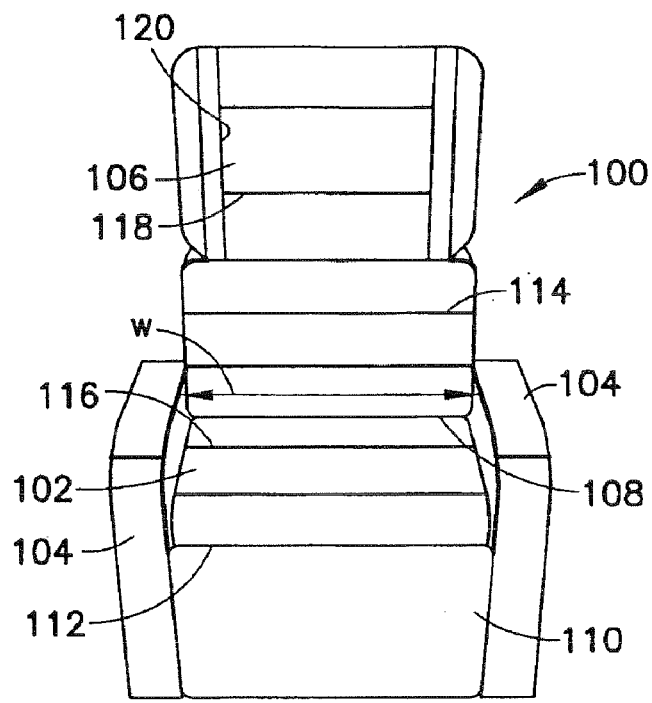
FIG. 1 is a perspective view of a prior art seat in an erect condition.
Figure 2:
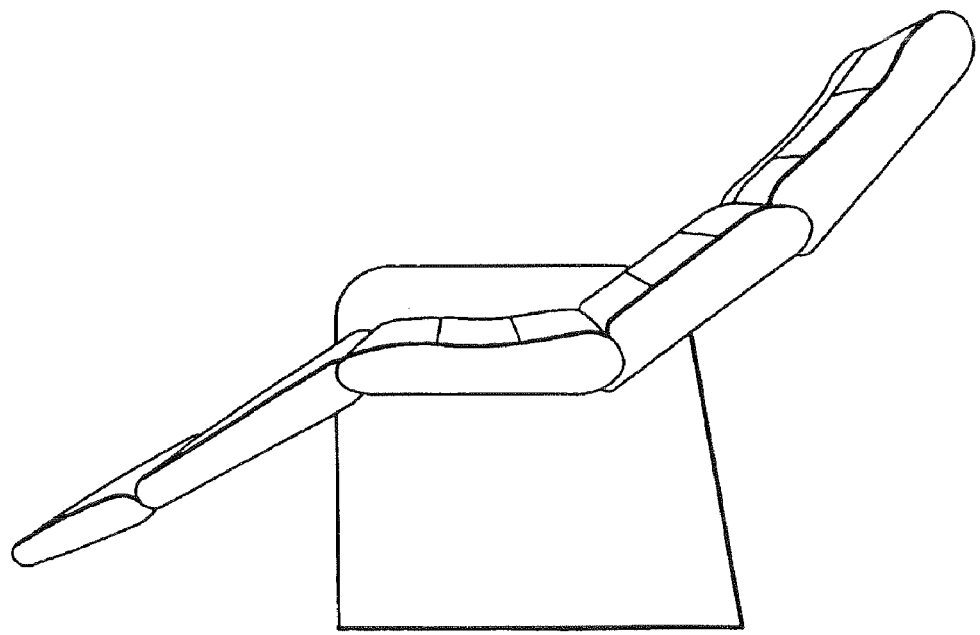
FIG. 2 is a perspective view of the prior art seat in a partly reclined condition.
Figure 3:
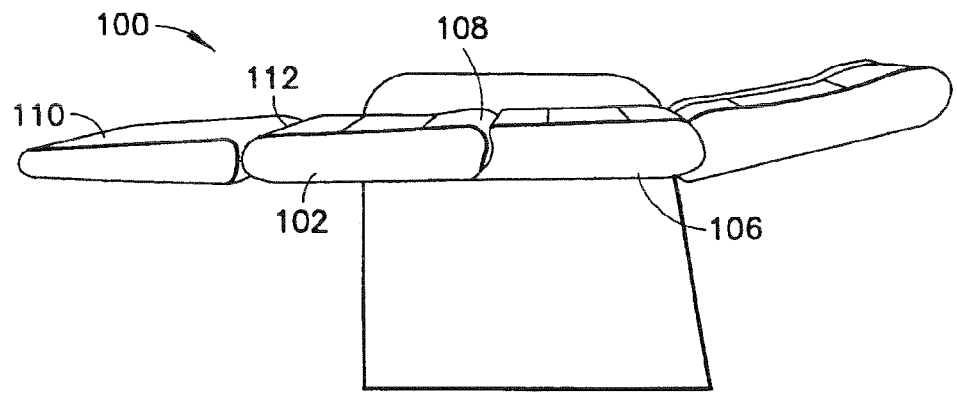
FIG. 3 is a perspective view of the prior art seat in a fully reclined condition.
Figure 4:
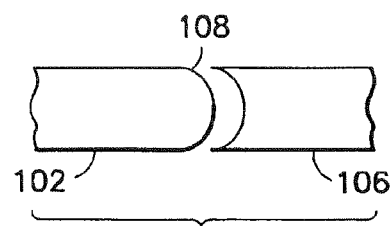
FIG. 4 is a cross-sectional view taken along line 4-4 in FIG. 3.
Figure 6:
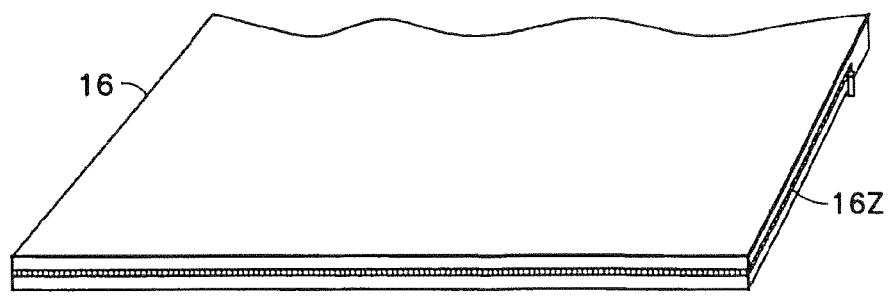
FIG. 6 is a perspective view of an end portion of the seating pad assembly with the outer cover removed.

A seating pad assembly in accordance with the subject invention is identified generally by the numeral 10 in FIGS. 5 through 12. The seating pad assembly includes 10 an inner viscoelastic foam cushion 12 formed from and consisting essentially of a viscoelastic material, such as those that are available from several commercial sources, including TEMPUR-PEDIC. The seating pad assembly 10 is generally rectangular and has a length L and a width W as shown in FIG. 4. The length and width dimensions L and W will vary in accordance with the class of service for which the seating pad assembly 10 is being marketed. In particular, first class airline seats often are wider than business class and some seats include footrests that extend longitudinally as the seat is reclined. In a preferred embodiment, the seating pad assembly 10 has a width W of approximately 16 inches for economy class seats and approximately 20 inches for business or first class seats. These widths enable the seating pad assembly 10 to occupy a major portion of the width "w" of the targeted seat. However, other seating pad assemblies 10 may be slightly narrower or slightly wider. The length L of the seating pad assembly 10 also will vary in accordance with the class of travel service for which the seating pad assembly 10 is purchased and marketed. In a preferred embodiment, the seating pad assembly 10 has a length L of approximately 42 inches for economy class seats, a length L of approximately 47 inches for business class seats and a length L of approximately 60 inches to 72 inches for first class seats. However, seating pad assemblies 10 with a length L as small as about 40 inches will achieve many of the benefits described herein, particularly for short trips where the seat does not recline and with respect to the most objectionable gap 108 between the hip/thigh support 102 and the back support 106 of the prior art seat 100.

Figure 5:
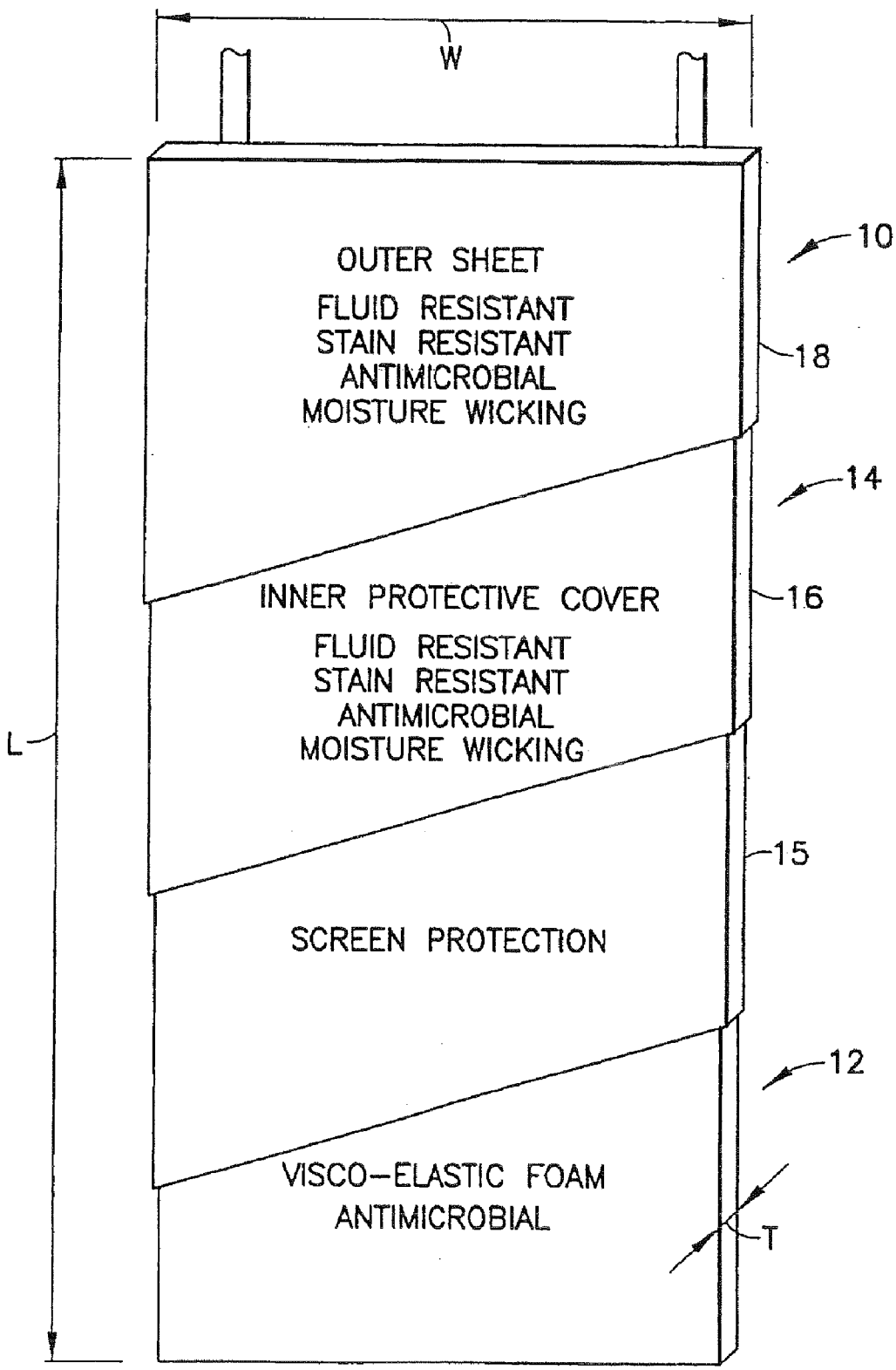
FIG. 5 is a perspective view, partly in section, of a seating pad assembly in accordance with the invention.
Figure 7:
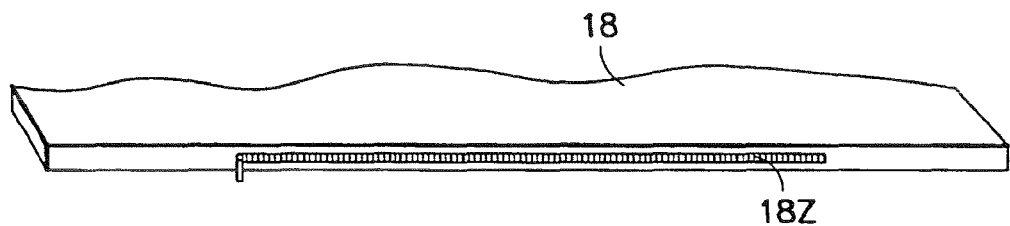
FIG. 7 is a perspective view of a side portion of the seating pad assembly showing the zipper closure for the outer cover.

The viscoelastic inner cushion 12 of the seating pad assembly 10 has a thickness "T" as shown in FIG. 5. The thickness "T" preferably is in the range of 1.0-1.5 inch, and most preferably is approximately 1.0 inch to facilitate storage and carrying. However, the ability of the inner cushion 12 to be transported easily and to provide the necessary comfort for long distance travel also depends on the density of the viscoelastic foam. A viscoelastic foam with a density of 3 lbs/cubic foot to 8 lbs/per cubic foot and a thickness T of 1.0-1.5 inch has been found to provide comfortable support across the gaps 108 and other surface discontinuities of the prior art airline seat while still being easily transportable. However, a viscoelastic inner cushion 12 with a density of 5 lbs/cubic foot and a thickness T of 1.0 inch has been found to provide very good levels of comfort and very desirable storage and carrying characteristics, as explained herein. The viscoelastic inner cushion 12 also should have a firmness that permits the viscoelastic inner cushion 12 to conform to the shape of the seat 100 and to the passenger without bottoming out. Thus, the viscoelastic cushion 12 will redistribute the weight and surface pressure of the passenger.

The seating pad assembly 10 further includes a cover assembly 14 that substantially completely encloses the viscoelastic cushion 12. In this regard, the viscoelastic foam material of the cushion 12 is not comfortable for direct long term contact by the traveler. Additionally, the viscoelastic foam of the cushion 12 is not well suited for soil or stain resistance and could become unsightly after several uses. Furthermore, viscoelastic foam cushions are not aesthetically attractive, even when clean. The cover assembly 14, on the other hand, can be made from relatively inexpensive materials that are comfortable for direct long term contact by the traveler.

The cover assembly 14 includes an inner screen layer 15 that completely surrounds the viscoelastic cushion 12. The inner screen layer 15 preferably is a thin gauge mesh formed from synthetic fibers, such as nylon, that will protect the viscoelastic cushion 12 when other parts of the cover assembly 14 are removed for cleaning, maintenance or replacement. Additionally, the inner screen layer 15 is stretchable and/or sufficiently loose to permit substantially unrestricted deformation and/or flow of the viscoelastic cushion 12 into the pinch points on the seat 100.

The cover assembly 14 further includes an inner cover 16 removably mounted over the inner screen layer 15 and the viscoelastic cushion 12. The inner cover 16 is formed from a fluid resistant, stain resistant material with moisture wicking and antimicrobial characteristics such as a stretchable knitted fabric made from a blend of cotton and synthetic fabric. Additionally, the inner cover 16 includes an inner closure 16z, such as a zipper, that extends across one end edge and adjacent side edges of the inner cover 16. The inner closure 16z enables the inner cover 16 to be separated from the viscoelastic cushion 12 for cleaning, maintenance or replacement.

The cover assembly 14 further includes an outer cover 18 that is removably mounted over the inner cover 16. The outer cover 18 is formed from a fluid resistant, stain resistant material with moisture wicking and antimicrobial characteristics. For example, the outer cover 14 can be formed from a stretchable woven cotton fabric (300-1000 thread count) or a brush knit fabric that is soft to the touch and comfortable even after a long term of contact. More particularly, the outer cover 14 can be formed from materials that are commonly used on bed sheets. Furthermore, the outer cover 14 can be made aesthetically attractive and can be printed with indicia to identify the owner of the cushion or to promote a particular trademark. For example, the indicia can be the name of an airline that sells the pad assembly 10 to frequent travelers. Alternatively, the indicia can be the trademark of the employer of the traveler.

The outer cover 18 includes an outer closure 18z, such as a zipper, that extends along a major part of one side edge of the outer cover 18. The outer closure 18z enables the outer cover 18 to be separated from the viscoelastic cushion 12 and the inner closure 16 for cleaning, maintenance or replacement.

Figure 8:
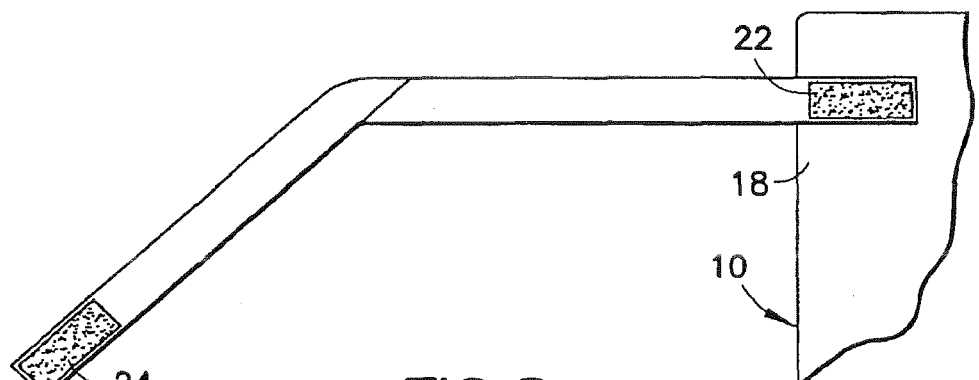
FIG. 8 is a top plan view of a corner of the seating pad assembly and showing one of the closure straps in an extended condition.
Figure 9:
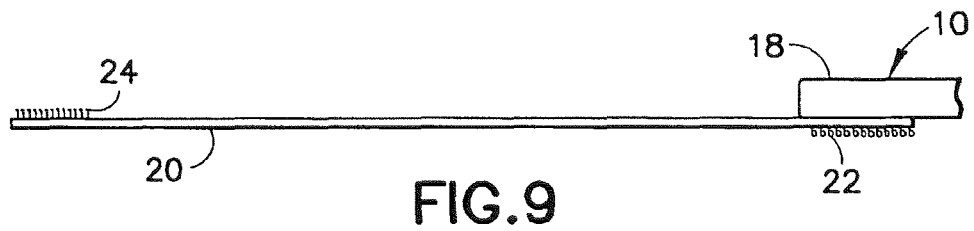
FIG. 9 is a side elevational view of a corner of the seating pad assembly and showing the extended closure strap.
Figure 10:
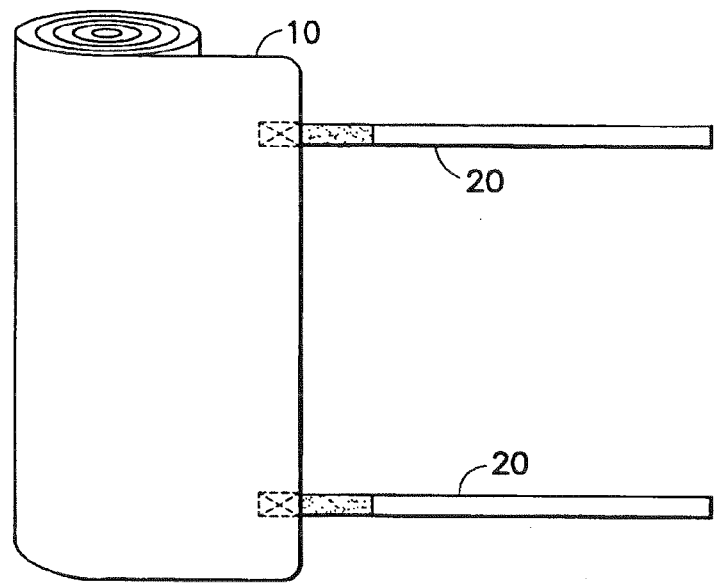
FIG. 10 is a perspective view of the seating pad assembly in a partly rolled condition.
Figure 11:
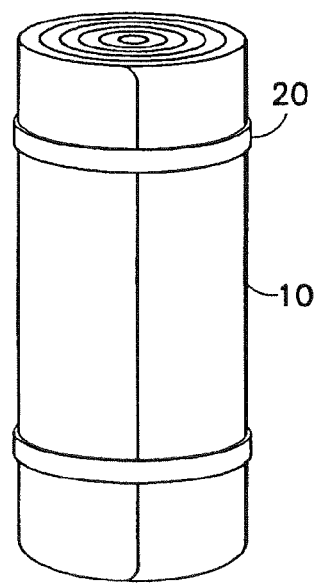
FIG. 11 is a perspective view of the seating pad assembly in a fully rolled condition for storage.
Figure 12:
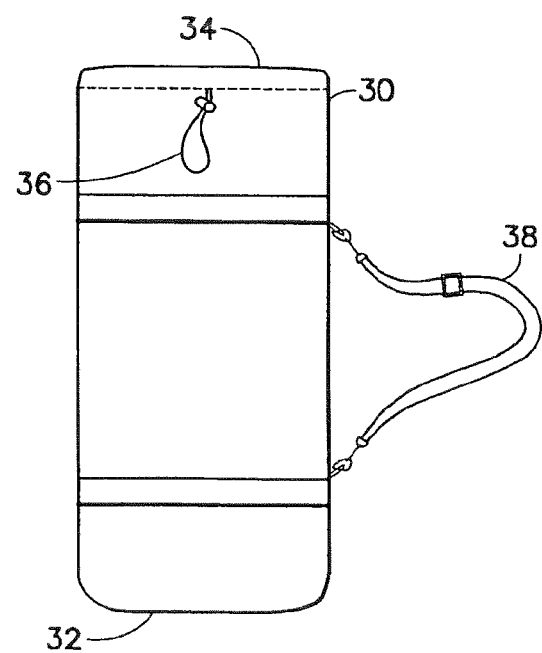
FIG. 12 is a front elevational view of a carrying bag for use with the rolled seating pad assembly of FIG. 11.

Two straps 20 are secured to portions of the outer cover 17 adjacent one longitudinal end and extend longitudinally beyond the outer cover 18, as shown most clearly in FIGS. 8-10. Portions of each strap 20 sewn or otherwise secured to the outer cover 18 have an array of Velcro loops 22 facing away from the outer cover 18. A mating array of Velcro hooks 24 are provided on the opposite side of each strap 20 at the end of the strap 20 remote from the outer cover 18. The straps 20 enable the seating pad assembly 10 to be secured in the rolled configuration of FIG. 11.

Figure 13:
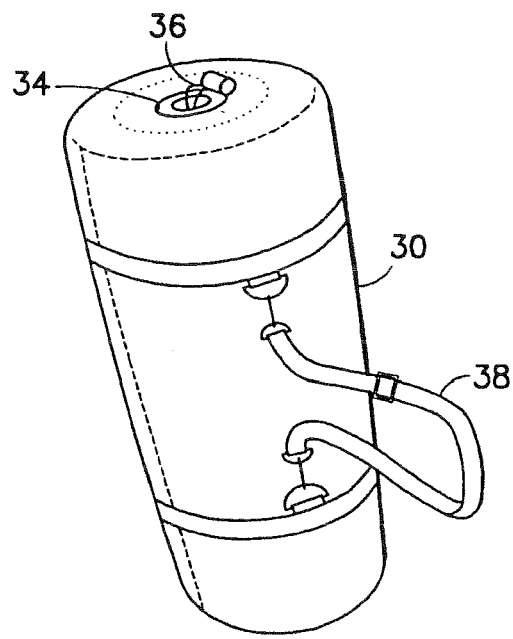
FIG. 13 is a perspective view of the rolled seating pad assembly stored in the carrying bag of FIG. 12.
Figure 14:
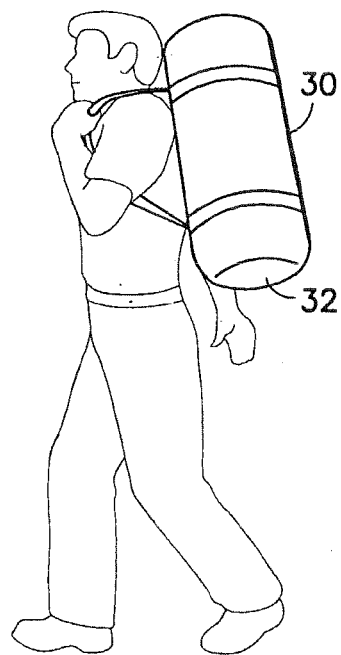
FIG. 14 is a perspective view of a person carrying the rolled seating pad assembly stored in the carrying bag.
Figure 15:
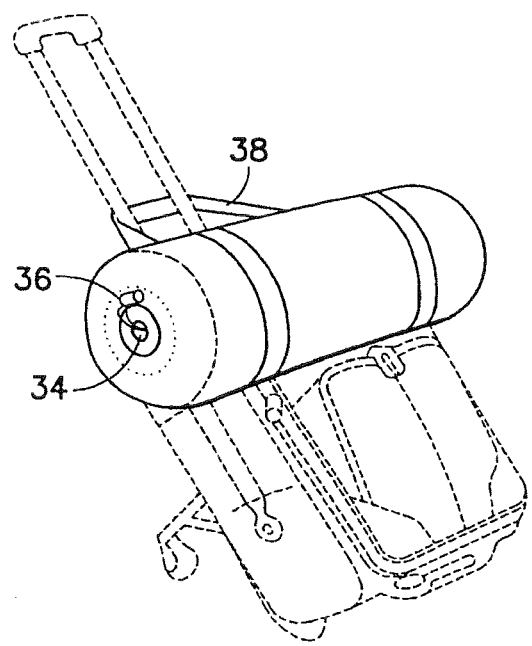
FIG. 15 is a perspective view of the rolled seating pad assembly stored in the carrying bag and secured on a piece of rolling luggage.

The seating pad assembly 10 also can be used with a carrying bag 30, as shown in FIGS. 12-15. The carrying bag 30 has a closed bottom end 32 and an open top end 34. A draw string 36 is incorporated into a hem adjacent the open top end 34. The carrying bag 30 also includes a carrying strap 38. In the collapsed condition shown in FIG. 12, the carrying bag 30 is a generally flat rectangle. However, the carrying bag 30 can be opened to receive the seating pad assembly 10 that has been rolled into the coil shown in FIG. 11. This combination of the seating pad assembly 10 and the carrying bag 30 is illustrated in FIG. 13. The carrying strap 38 can be suspended from the shoulder of the traveler while traveling between flights or destinations, as shown in FIG. 14. Alternatively, the carrying strap 38 can be looped over the handle of a roll-on piece of luggage, as shown in FIG. 15 or can be attached to a backpack. A pocket can be provided in the carrying bag 30 to carry travel documents, identification cards or the like.

Figure 16:
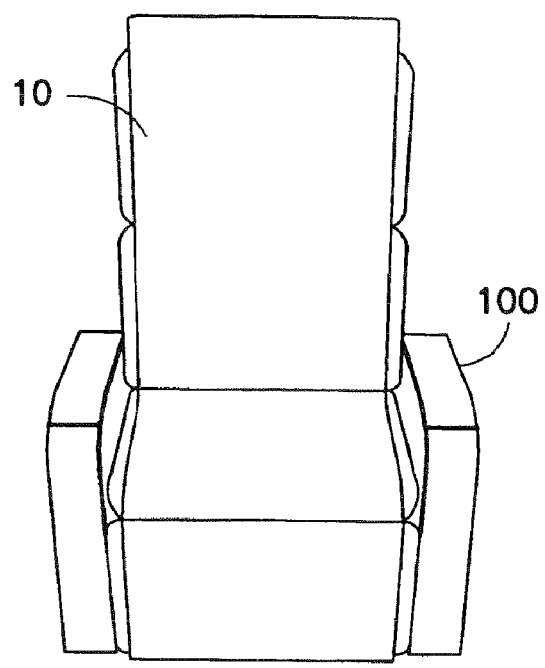
FIG. 16 is a perspective view of the seating pad assembly of FIGS. 5-11 positioned on the fully erect airline seat of FIG. 1.
Figure 17:
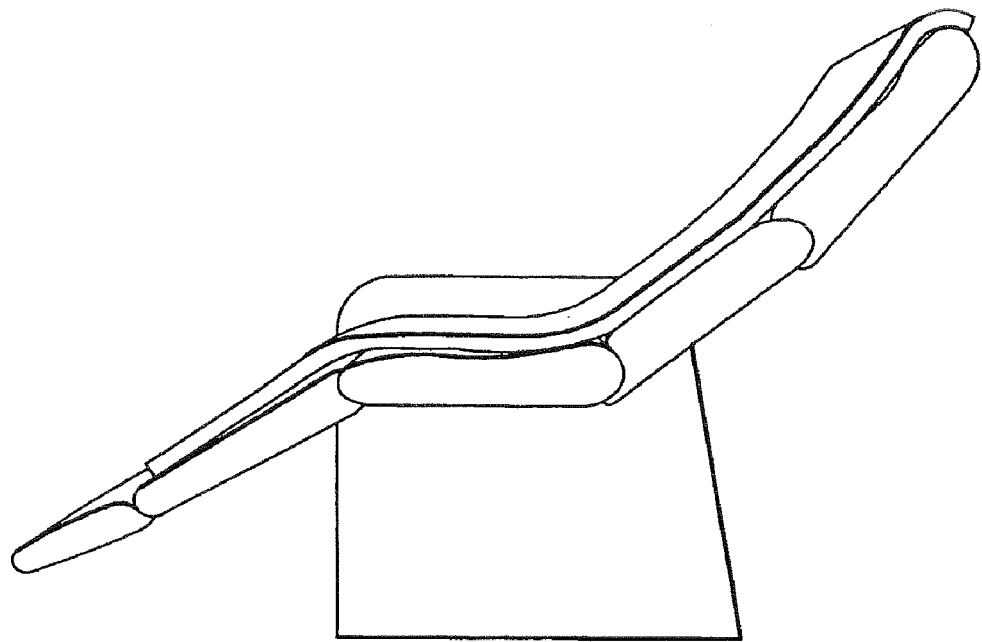
FIG. 17 is a perspective view of the seating pad assembly of FIGS. 5-11 positioned on the partly reclined airline seat of FIG. 2.
Figure 18:
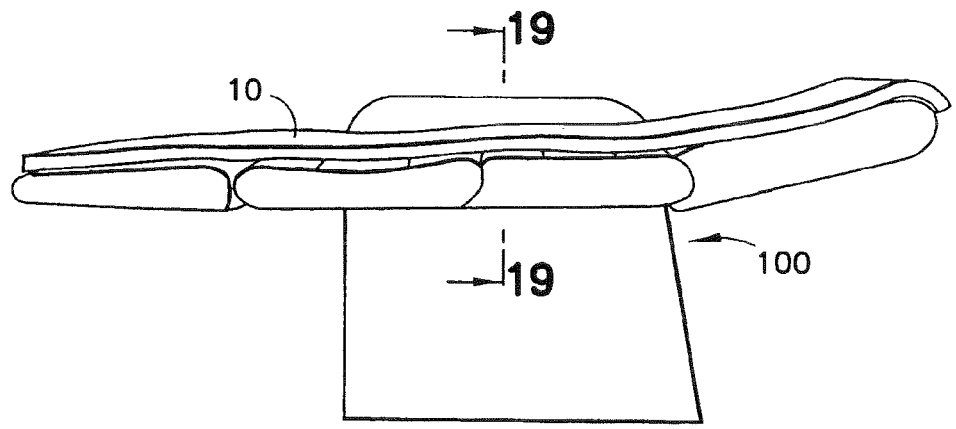
FIG. 18 is a perspective view of the seating pad assembly of FIGS. 5-11 positioned on the fully relined airline seat of FIG. 3.

The seating pad assembly 10 is used by opening the draw string 28 near the top 26 of the carrying bag 22 and removing the rolled seating pad assembly 10 from the carrying bag 22. The straps 20 then are opened and the seating pad assembly 10 is unrolled from the FIG. 10 condition to the FIG. 4 condition. The open seating pad assembly 10 then is placed on the seat 100 substantially as shown in FIG. 15-17 before the traveler sits down. Thus, the seating pad assembly 10 is not part of the carry on luggage that must be stowed, and effectively becomes a temporary part of the seat 100. One longitudinal end the seating pad assembly 10 is positioned near the top of the seat back support 106. The remainder of the seating pad assembly 10 extends from the top of the back support 106 across the gap 108 between the hip/thigh support 102 and the back support 106 and towards or to the leg rest 110. The extent of the seating pad assembly 10 to or towards the leg rest 110 will depend upon the overall length L of the pad assembly 10 relative to the length "l" of the seat 100. In preferred embodiments, the seating pad assembly 10 will be sufficiently long to extend completely to the end of the leg rest 110 farthest from the hip/thigh support 102. Some seats 100 have a footrest 114 that telescopes or otherwise extends longitudinally away from the hip/thigh support 102 as the seat 100 is moved into the fully reclined condition. In this situation, one longitudinal end portion of the seating pad assembly 10 may be tucked between the remainder of the seating pad assembly 10 and the leg rest 110 to define a flap 34, as shown in FIGS. 15 and 16. However, the flap 34 can be unfolded as the seat 100 moves into the fully reclined condition shown most clearly in FIG. 17 so that the flap 34 can be disposed on the footrest 114.

As noted above, the width W of the seating pad assembly 10 preferably is in the range of 16-20 inches, and hence will fit conveniently between the armrests 104 of the seat 100 without creating potentially objectionable bulges or bumps.

The seating pad assembly 10 extends continuously across the objectionable gap 108 between the hip/thigh support 102 and the back support 106. The viscoelastic cushion 12 responds to both ambient temperature (60-75 F) and body temperature for conforming to the shape of the passenger for providing three dimensional support for the passenger when the seat is erect, partially reclined and fully reclined. The thickness T of the viscoelastic cushion 12 and the density and firmness of the viscoelastic foam of the cushion 12 enable the traveler to be supported comfortably across rigid structures in the seat 100, as well as across the gap 108 between the hip/thigh support 102 and the back support 106. Thus, the conformal nature of the viscoelastic cushion 12 avoids the objectionable sensations caused by the gap 108 when a traveler is sitting erect or attempting to relax in the reclined condition of the seat 100, as shown in FIGS. 16 and 17. Furthermore, the viscoelastic foam of the cushion 12 is extremely effective at absorbing travel-related vibrations and associated micromovements of the seat 100 and the passenger. These vibration-related micromovements contribute significantly to passenger discomfort and are dampened very effectively by the viscoelastic cushion 12.

Figure 19:
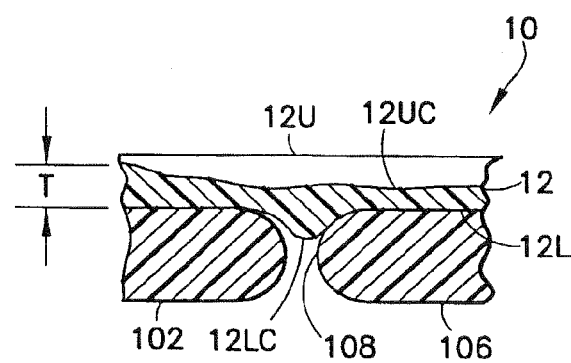
FIG. 19 is a cross-sectional view taken along line 19-19 in FIG. 18.

The ability of the seating pad assembly 10 to achieve these objectives is dependent partly upon the thickness T and the characteristics of the viscoelastic cushion 12. As explained above, the preferred cushion 12 is formed from a viscoelastic foam with a density in the range of 50-120 kg/m$^3$, with a preferred density of about 85 kg/m$^3$. Additionally, the preferred viscoelastic material has a hardness or firmness of about 10N. Viscoelastic materials with these specifications and with a thickness T of about 1 inch have proven to provide high levels of comfort with little or no sensory evidence of the gap 108, hard structural supports of the seat 100 or the vibrations of the vehicle regardless of whether the seat 100 is erect, reclined or partly reclined. In this regard, the density, firmness, resiliency and thickness of the viscoelastic cushion 12 enable lower surface 12L of the viscoelastic cushion 12 to flow into and conform to the gap 108 and other pinch points, as shown in FIG. 19, thereby creating a convex lower conformal area 12LC and a substantially smooth uniform upper surface 12U for facing the traveler. The cover assembly is sufficiently stretchable and/or loose to permit the viscoelastic material 12 to flow or conform substantially unimpeded into the potential pinch points and around hard points. Furthermore, the density, hardness, firmness, resiliency and thickness characteristics of the viscoelastic cushion 12 ensure that weight of the traveler will create a concave upper conformal area 12UC that will be spaced above the lower surface 12L,
above the supports 102, 106 and above the pinch point defined by the gap 108. Additionally, the weight of the traveler will be distributed and supported by upper parts of the viscoelastic cushion 12 without a bottoming out that would occur if the viscoelastic cushion 12 had a thickness, density, hardness and/or resiliency to be deformed maximally. Thus, deformation of the top and bottom surfaces of the viscoelastic cushion 12 assures optimum support and weight distribution and isolates the traveler from the bothersome pinch points and hard points. Accordingly, the traveler can changed positions without disengaging tissue that would otherwise have been squeezed into the gaps and other pinch points. Still further, the three dimensional support of the traveler achieved by the viscoelastic cushion 12 helps to dampen travel-related vibrations. Viscoelastic materials with different density and hardness characteristics can be employed, but may require different thicknesses.

The seating pad assembly 10 may be sold at retail stores (kiosks at transportation centers, kiosks at shopping centers, specialty gift stores, major retailers, etc), through catalogs (e.g. in-flight catalogs), via television (shopping networks, infomercials, etc) or via the Internet. The Internet transactions can be through a supplier's own website, other unaffiliated retail web destinations, mobile web destinations, interactive outdoor sales via Bluetooth/Wi-Fi or touch screen installations in public spaces. Additionally, the seating pad assembly 10 may be sold, rented or otherwise offered to passengers in association with the offering of transportation services. For example, the seating pad assembly 10 can be offered to passengers as part of the check-in or seat selection process. Additionally the seating pad assembly 10 can be offered and/or delivered to passengers after the passengers have passed through security clearance points at an airport, in much the same way that goods are offered at duty free shops. Alternatively, the seating pad assembly 10 can be rented for delivery to the passenger shortly prior to departure and for pick-up from the passenger shortly after disembarking. The cover assembly 14 may be removed and cleaned after each such rental.

The above-identified sale or rental procedures offered at an airport or other transportation terminal provide several very significant advantages and efficiencies. For example, the ability to pick up a purchased or rented seating pad assembly 10 after arriving at the transportation facility and preferably after passing through security significantly reduces the amount of personal property that must be carried by the passenger enroute to the transportation facility. The ability to take possession of the seating pad assembly 10 after having passed through security simplifies and shortens the security procedure, thereby leading to a more efficient flow of passengers through security. Additionally, the seating pad assembly 10 need not be considered part of the luggage that can be carried onto a plane because the seating pad assembly 10 need not be stowed in an overhead compartment or beneath a seat, and merely is positioned between the passenger and the existing seat on an airplane, train or other vehicle. The ability to take possession of the seating pad assembly 10 prior to boarding the plane has other advantages as well. Specifically, the seating pad assembly can be used by the passenger at the airport during the delays that frequently are encountered at airports. Thus, the seating pad assembly 10 can be used to increase the comfort of inherently uncomfortable seats in a transportation terminal. The seating pad assembly also can be used on local transportation prior to reaching a final point of disembarking (e.g. an airport shuttle). The ability to return a seating pad assembly 10 at the end of a trip reduces the amount of baggage that the passenger will have to carry when leaving the airport or other transportation facility.

In certain instances, the passenger may chose to own rights to a seating pad assembly 10 but to possess the seating pad assembly 10 only while traveling or waiting to travel. For example, a person may provide proof of ownership of a seating pad assembly 10 prior to, during or after the check-in process at the transportation facility. An appropriately dimensioned seating pad assembly 10 then will be made available to the passenger for use during travel. The passenger may be charged an annual maintenance fee or a maintenance fee per trip to cover cost associated with periodic cleaning of the seating pad assembly 10. These charges may be collected by the airline or a separate business at the transportation terminal.

Still further, the offering of the seating pad assembly can be tied to frequent flier programs. Thus, the seating pad assembly 10 can be offered to passengers with a specified level of frequent flier status (e.g. gold, platinum, etc.). Similarly, the seating pad assembly 10 can be purchased or rented with frequent flier points or miles, and the purchase or rental of the seating pad assembly 10 can be used to trigger certain frequent flier benefits, such as points or related products or services.

Figure 20:
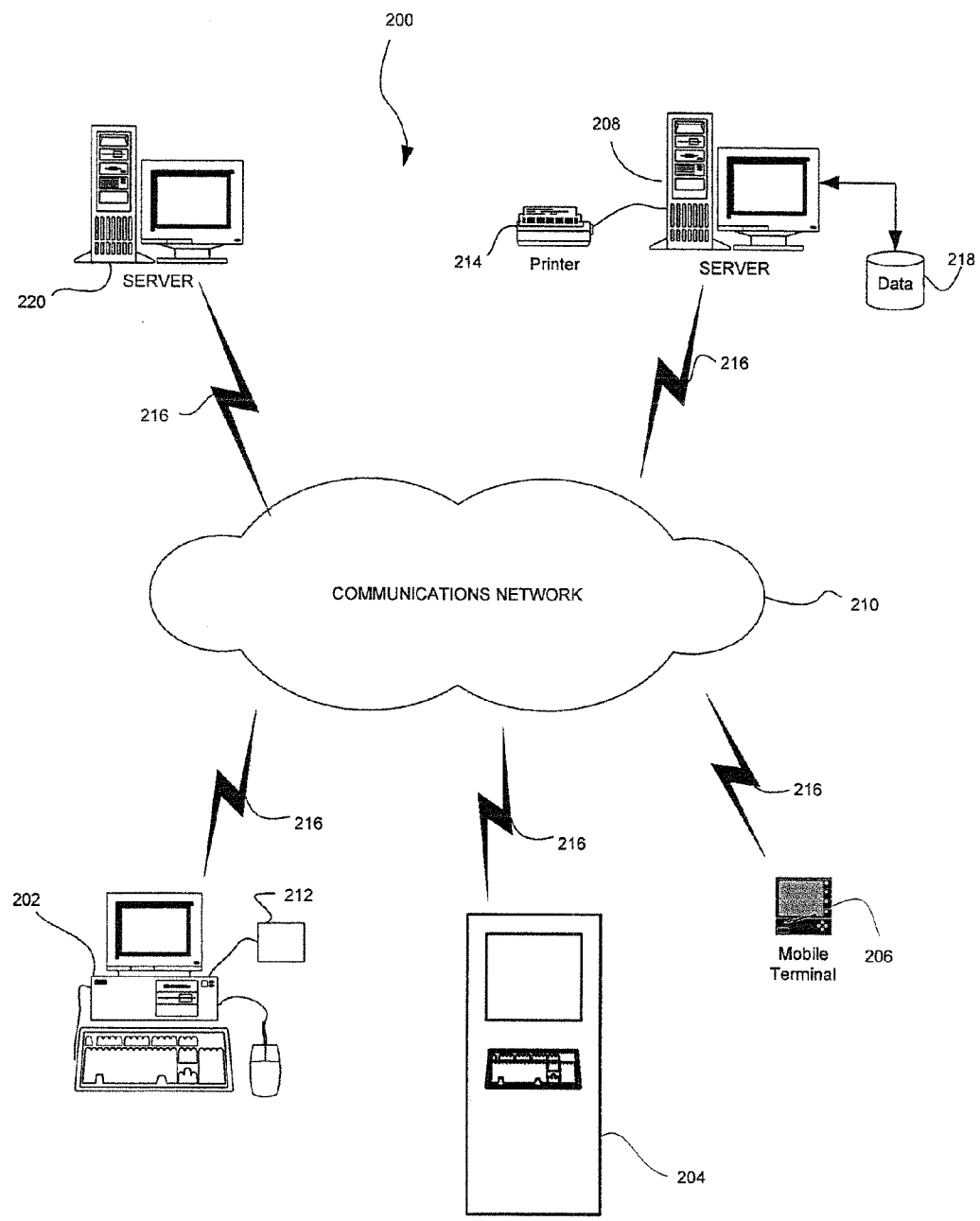
FIG. 20 is an exemplary system for ordering a seating pad assembly in accordance with the present invention.

Referring to FIG. 20, a system 200 for ordering a seating pad assembly to be used for a transportation seat is illustrated. The system 200 includes a terminal, e.g., a user computer 202, a kiosk 204 or a mobile terminal 206, for accessing a server 208 over a communications network 210, e.g., the Internet. The kiosk 204 can be a dedicated kiosk provided for a purchase or rental of the seating pad assemblies. Alternatively, the kiosk 204 can be an automatic check-in terminal adapted to permit a passenger to request a seating pad assembly as part of the check-in process. The request for the seating pad assembly that is carried out as part of the check-in process may generate a charge on the credit card that is use for the check-in process, a charge against frequent flyer miles for the account associated with the passenger and the airline or a free optional service for passengers with certain ticket categories (e.g. first class or business class). Other optional terminals can include telephones, cellular telephones or PDI's. The terminal 202, 204, 206 and server 208 will communicate using any conventional architecture, for example a client/server architecture where the terminal will execute a client application, e.g., a web browser, to access an application executing on the server 208. The terminal will access the server 208 to enable a user to order, e.g., purchase or rent, a seating pad assembly of the present invention as will be described below. The server 208 will determine the dimensions, e.g., a width, length, and/or thickness, of the seating pad assembly based on the type of transportation seat purchased, e.g., coach, business or first class. The server 208 will generate an order for the user to acquire the seating pad assembly. The terminal will include a communication module 212 for communicating to the remote server 208.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture such as a personal computer, a workstation or server 208. Preferably, the machine is implemented on a computer platform having hardware such as one or more central processing units (CPU), a random access memory (RAM), a read only memory (ROM) and input/output (I/O) interface(s) such as a keyboard, cursor control device (e.g., a mouse or joystick) and display device. A system bus couples the various components and may be any of several types of bus structures including a memory bus or memory controller, a peripheral bus, and a local bus using any of a variety of bus architectures. The computer platform also includes an operating system and micro instruction code. The various processes and functions described herein may either be part of the micro instruction code or part of the application program (or a combination thereof) which is executed via the operating system.

In addition, various other peripheral devices may be connected to the computer platform of the machine by various interfaces and bus structures, such a parallel port, serial port or universal serial bus (USB). One such peripheral device may include a communications device, e.g., a modem, satellite relay, wireless connection, etc., for enabling communications from the server 208 to the various terminals 202, 204, 206. Other peripheral devices may include additional storage devices or a printer 214 for printing generated work orders bearing instructions to deliver the seating pad assembly to an intended recipient.

It is to be further understood that, because some of the constituent system components and method steps depicted in the accompanying figures may be implemented in software, the actual connections between the system components (or the process steps) may differ depending upon the manner in which the present invention is programmed. Given the teachings of the present disclosure provided herein, one of ordinary skill in the related art will be able to contemplate these and similar implementations or configurations of the present invention.

The terminals 202, 204, 206 and/or server 208 may operate in a networked environment using logical connections to one or more remote computers. The remote computer may be a personal computer, a server, a router, a network PC, a peer device or other common network node, and typically includes many or all of the elements described above relative to the machine. It is to be appreciated that the network 210 may be a local area network (LAN), wide area network (WAN), the Internet or any known network that couples a plurality of computers to enable various modes of communication via network messages. The terminal may communicate to the server 208 and network 210 via any known communication link 216, for example, dial-up, hardwired, cable, DSL, satellite, cellular, PCS, wireless transmission (e.g., 802.11a/b/g, etc.), etc. Furthermore, the devices will communicate using the various known protocols such as Transmission Control Protocol/Internet Protocol (TCP/IP), File Transfer Protocol (FTP), Hypertext Transfer Protocol (HTTP), etc. During a purchasing transaction, the computing devices may employ Hypertext Transfer Protocol Secure (HTTPs), Secure Sockets Layer (SSL) Protocol, Secure Electronic Transaction (SEC) Protocol, etc.

In one embodiment, a traveler or purchaser of a transportation seat desiring to acquire a seating pad assembly of the present invention will access server 208 via any available client, e.g., terminal 202, kiosk 204, mobile terminal 206, etc. The purchaser will input into the client an identifier indicative of a type of transportation seat purchased. This identifier may be a class of service of the seat purchase for example coach, business or first class of an airline seat purchased. The identifier will be received by the server 208 and the server 208 will determine the proper seating pad assembly based on the type of transportation seat purchased by interacting with database 218. Preferably, the proper seating pad assembly will include dimensions (including a width, length, and thickness) to ensure a proper fit of the seating pad assembly to the type of seat purchased as described above. The server will then generate an order to acquire the determined seating pad assembly. In certain embodiments, the order will include an option to purchase the seating pad assembly or to simply rent the seating pad assembly for the particular route purchased. Next, the server will fulfill the generated order to complete acquisition of the seating pad assembly. The purchaser may complete the transaction by providing the appropriate debit card or credit card information. Alternatively, the purchaser may complete the transaction by providing a frequent flier account number and a predetermined number of frequent flier miles will be debited from the purchaser's account.

In one embodiment, once the transaction is completed, the server 208 will generate a work order and print out the work order at an appropriate terminal of the facility where the purchaser will begin their trip. For example, where the transportation seat purchased is an airline seat, the work order will be printed out at the terminal where the purchaser is departing from. The seating pad assembly will be prepared and delivered to the purchaser at the terminal, for example, the seating pad assembly is delivered to the purchaser of the transportation seat after the purchaser has passed through security at the airport. If the purchaser has purchased the seating pad assembly, the purchaser will retain the seating pad assembly after the purchaser has reached their destination. Otherwise, if the seating pad assembly was rented, the seating pad assembly will be reclaimed from the purchaser at a point of disembarkation.

In another embodiment, the server 208 will receive a second identifier indicative of a transportation seat provider, e.g., an airline carrier, from the purchaser. Based on the transportation seat provider, the server 208 will further select a cover assembly for the seating pad assembly bearing an indicia of the transportation seat provider. The determined seating pad assembly and corresponding cover assembly will be printed on the work order and the seating pad assembly will be assembled before delivering to the purchaser.

It is to be appreciated that the first identifier for the type of seat purchased and the second identifier of the transportation seat provider may be entered in one session while communicating to the server. For example, where the terminal is a kiosk, the purchaser of a transportation ticket may scan the ticket at the kiosk and the kiosk will subsequently transmit the first and second identifier to the server for processing.

In another embodiment, a purchaser of a transportation ticket may purchase the seating pad assembly while purchasing the initial ticket for the seat. For example, a purchaser may purchase a ticket from a terminal by accessing a server 220 of the transportation seat provider via a conventional web site. While conducting the transaction for purchasing the ticket, the server 220 of the transportation provider may provide a link to the server 208 to enable the purchaser to acquire the seating pad assembly. Alternatively, the server 208 may communicate with server 208 and perform the transaction for the purchaser without additional charge to the purchaser based on a preferred status of the purchaser, e.g., a frequent flier, club member, etc.

While the invention has been described with respect to a preferred embodiment, it is apparent that various changes can made without departing from the scope of the invention as defined by the appended claims. In this regard, different length, width and thickness dimension can be provided in accordance with the preferences of the traveler and the dimensions of the seat.

A rectangular seating pad assembly 10 offers several cost efficiencies and carrying efficiencies. However, nonrectangular pads can be provided. For example, notches can be provided at areas where seat belts extend from the seat. Additionally, areas that will be adjacent the knees and lower legs can be narrower than areas adjacent the hips or shoulders.

Still further, the extreme lower portion of the seating pad assembly 10 can be configured to articulate more easily. Thus, a well defined hinge line may be defined substantially adjacent the flap 34 near the bottom end of the seating pad assembly 10. The flap 34 can be formed by an entirely separate piece of viscoelastic foam material that may be inserted into an entirely separate pocket of the outer cover 18 of the cover assembly 14.

Straps 20 with a VELCRO attachment were illustrated in the preferred embodiment. However, other forms of straps can be provided for holding the pad assembly 10 in a rolled condition. For example, straps configured to be tied in a knot may be provided or straps with a simple buckle can be provided.

The pad assembly 10 may further be provided with structure for releasably affixing the pad assembly 10 to upper portions of the back support 106 of the seat 100. These attachments features can be straps, snaps or the like.

These variations and others will be apparent to persons skilled in this art after having read this disclosure.

What is claimed is:

1. A seat assembly, comprising:
a first support;
a second support in proximity to the first support with at least one gap being defined between the first and second supports; and
a seating pad removably positionable on at least parts of the first and second supports and being dimensioned to cover substantially all of the first support and at least part of the second support, the seating pad including a viscoelastic foam cushion having a bottom surface and a top surface opposite the bottom surface, the viscoelastic foam cushion having a density, hardness and thickness selected to permit portions of the viscoelastic foam cushion adjacent the bottom surface to flow into and conform to the gap between the first and second supports to define a convex lower conformal area nesting with the gap, the seating pad further having firmness, resiliency and thickness characteristics so that a concave upper conformal area caused by weight of a person using the seat assembly is spaced above the supports and the gap.

2. The seat assembly of claim 1, further comprising a cover substantially surrounding the viscoelastic foam cushion and being sufficiently stretchable or loose to permit substantially unimpeded deformation of the viscoelastic foam cushion into the gap.

3. The seat assembly of claim 2, wherein the viscoelastic foam cushion has a thickness of at least 1 inch.

4. The seat assembly of claim 3, wherein the viscoelastic foam cushion has a density of approximately 5 pounds per cubic foot.

5. The seat assembly of claim 3, wherein the viscoelastic foam cushion has a hardness of about 10 N.

6. The seat assembly claim 2, further comprising a carrying bag dimensioned for receiving the viscoelastic foam cushion and the cover assembly in a rolled condition.

7. The seat assembly of claim 1, wherein the viscoelastic foam cushion has a width of between approximately 16-20 inches, a length between approximately 42-60 inches and a thickness of at least approximately 1 inch.

8. The seat assembly of claim 1, further comprising at least one strap disposed and configured for securing the viscoelastic foam cushion in a rolled condition.

9. The seat assembly of claim 1, wherein the first and second supports are connected hingedly to one another.

10. The seat assembly of claim 1, wherein the first and second supports are part of a transportation seat.

11. The seat assembly of claim 1, wherein at least one of the first and second supports has at least one concave region spaced from the gap, the density and hardness of the viscoelastic foam cushion enabling portions of the viscoelastic foam cushion adjacent the bottom surface to flow into and conform to the concave region in at least one of the first and second supports.

* * * * *